Feb. 12, 1935. L. C. STUKENBORG Re. 19,465

VEHICLE LIFTING JACK

Original Filed Jan. 30, 1928

INVENTOR
LOUIS C. STUKENBORG
by J. H. Weatherford
ATTORNEY.

Reissued Feb. 12, 1935

Re. 19,465

UNITED STATES PATENT OFFICE 19,465

VEHICLE LIFTING JACK

Louis C. Stukenborg, Memphis, Tenn., assignor to Oildraulic Lift Company, Memphis, Tenn., a corporation of Delaware Original No. 1,803,682, dated May 5, 1931, Serial No. 250,468, January 30, 1928. Application for reissue January 20, 1933, Serial No. 653,910

10 Claims. (Cl. 60—52)

This invention relates to an improved fluid pressure actuated lifting jack and has especial relation to the piston or ram and the fluid actuating and control means associated therewith.

Among the objects of my invention is to provide an improved ram in which all the moving and actuating parts are assembled in a single compact unit.

The means by which the foregoing and other objects are accomplished and the manner of their accomplishment will readily be understood from the following specification on reference to the accompanying drawing in which.

Figure 1:
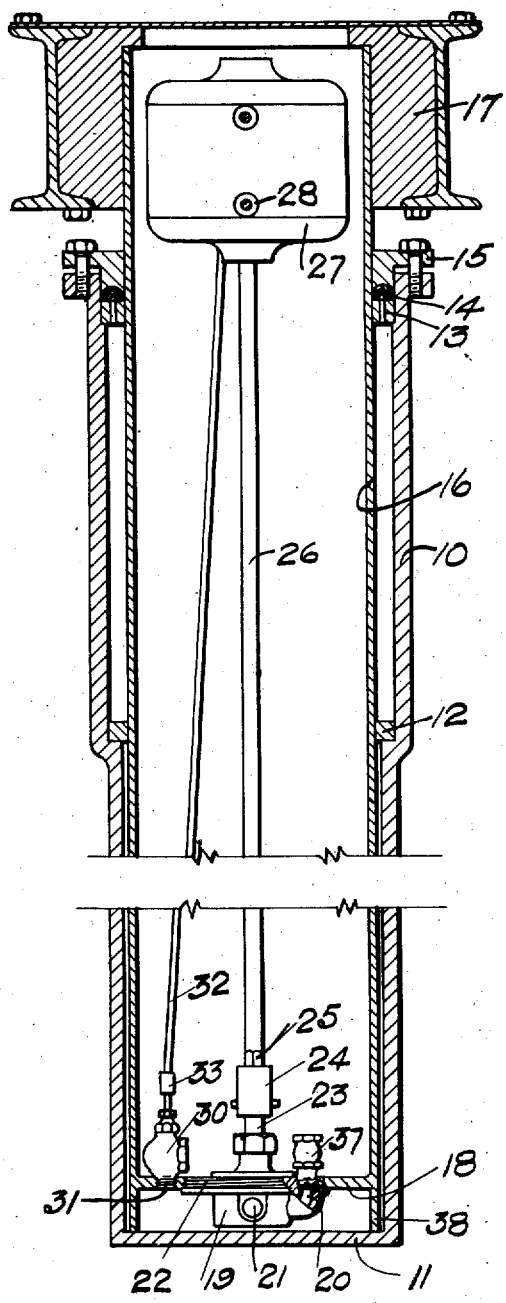
Fig. 1 is a sectional elevation taken on the approximate center line of the cylinder and piston, showing a preferred form of control.

Referring now to the drawing in which the various parts are indicated by numerals, 10 is a vertical cylinder having a closed bottom 11 and provided intermediate its height with a guiding ring 12 and near the upper end with a guiding ring 13 forming also the lower portion of a stuffing box, which stuffing box is provided with suitable packing 14, held in place by a packing gland 15. Disposed within the cylinder 10 is a hollow piston or ram 16 to the upper end of which a lifting head 17 of any desired form may be secured. The lower end of the hollow piston is closed by a head 18 and the piston is utilized as a reservoir in which the lifting fluid, preferably oil, is carried.

Figure 2:
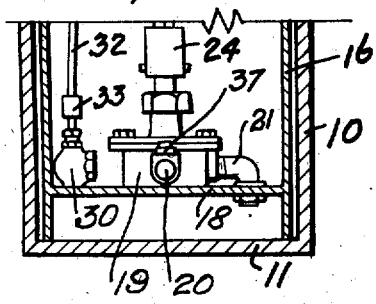
Fig. 2 is a similar elevation of the lower end of the cylinder and piston showing a minor modification in the pump mounting thereof.
Figure 3:
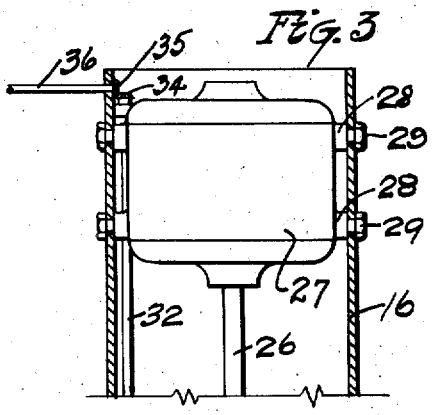
Fig. 3 is a sectional elevation of the upper end of the piston taken at right angles to the view shown in Fig. 1.

19 is a pump secured to the head 18 either, as shown in Fig. 1, to the under side thereof, or as shown in Fig. 2 to the upper side, which pump is provided with an inlet 20 directly connected with the interior of the piston 16, and with an outlet 21 leading from the pump to the interior of the cylinder 10 outside the piston 16.

In the form shown in Fig. 1 the pump is preferably provided with a threaded flange 22 which may be secured directly into the head 18 of the piston and in such case the pump inlet is preferably led directly through this flange as is indicated in that view.

23 is the pump shaft, which is preferably provided with a sleeve 24 secured thereto as by a through pin into which sleeve the squared lower end 25 of the motor shaft 26 may be slipped. 27 indicates an electric motor used for driving the pump. This motor is disposed entirely within the piston 16 so that preferably no portion thereof extends above the upper end of the piston 16. 28 are bosses extending laterally on opposite sides of the motor, into which bosses cap screws 29 may be secured, to suspend the motor within the piston 16.

30 is an angle valve, the inlet extension 31 of which may be secured through a suitable hole tapped through the head 18 of the piston, which valve forms a bleeder to allow the return of the fluid from the cylinder to the interior of the piston. From this valve, a control stem 32 leads to the upper end of the piston. Preferably this stem is connected to the stem of the valve 30 by a sleeve 33 similar to the sleeve 24 hereinbefore described. The upper end of the stem 32 may be provided with a bevel gear 34 and a similar bevel gear 35 be used in connection therewith, whereby a laterally extending operating rod 36 may be used to operate the valve from an exterior point.

If desired, a check valve 37 may be used to prevent return flow of the fluid through the pump. Should it be desired a continuation 38 of the piston may be carried below the head 18 to form a stop for the piston in its descent and to thereby protect the pump.

The chamber or pocket thus formed also serves to trap air which may be carried into the cylinder when the piston is being raised and to hold same in convenient proximity to the release valve, so that such air on the descent of the piston is carried into the piston reservoir and there released.

In order to limit the vertical lift of the piston, only such amount of fluid is placed therein as will, when completely used raise the piston to the desired height, so that the distance which the piston will lift, will thereby be automatically regulated without mechanical stops of any kind, whether the pump and motor be cut off at the proper time or not.

The motor 27 is placed at the top of the piston in order that the liquid level may be kept below the motor, and such regulation accomplished without encroaching on the motor or within that portion of the piston in which the available liquid area is so seriously diminished by the motor as to make such regulation impracticable.

By associating the pump and motor with the piston and especially by placing the pump at the point of discharge from the piston into the cylinder the control is greatly simplified and improved. The passageways for the flow of the liquid are reduced in length and angles or elbows are avoided. In addition the shipping and assembly of the pump is greatly facilitated and in every way the control improved.

In using the device the cylinder is ordinarily set in the ground with its upper end approximately level with the surface thereof. The piston assembly is then placed therein and the stuffing box gland tightened. The cylinder may be then supplied with the proper amount of fluid, the motor wired up in the usual manner and the device is ready for use.

To operate the jack, the bleeder valve 30 is closed, the motor 27 started and allowed to run until all the fluid is pumped from the piston into the cylinder after which the motor is preferably shut off. The piston will thereafter remain at such level until the bleeder valve is opened and it is again allowed to sink by gravity to its initial position.

Should it be desired to stop the piston in its upward stroke at any desired point, it is only necessary to shut the motor off when such position is reached. Should it be desired to stop the piston in its downward motion it is only necessary to close the bleeder valve when such position of descent has been reached, as is desired.

It will be understood that the drawing and description herein is illustrative only and that the details herein mentioned may be deviated from except as they may be hereinafter set out in the claims.

Having described my invention, what I claim is:

1. In a lifting jack, a vertically disposed hollow cylinder and a self contained lifting unit vertically movable therein, said unit comprising a tubular piston provided with a closure adjacent but spaced above its lower end and adapted to contain a lifting fluid, a pump carried by said closure and having its shaft centrally aligned thereby, said pump having parts projecting below said closure but terminating above the lower end of the piston, a motor carried by the upper end of said piston and having its shaft positioned by said piston in axial alignment with said pump shaft and means connecting said pump and motor shafts.

2. A lifting jack comprising a vertically disposed hollow cylinder and a self contained lifting unit vertically movable therein, said lifting unit comprising a hollow piston adapted to serve as a lifting fluid reservoir, a partition disposed transversely across said piston adjacent but above the lower end thereof whereby a chamber is formed below said partition, a pump secured to said head within said chamber and having its lower extremity terminating above the lower end of the piston whereby the pump is housed within said chamber and the lower end of the piston acts as a lower limit stop to protect the pump from injury, an intake for said pump within said piston, an outlet for said pump exterior to said piston and within said cylinder, a motor carried by said piston and operatively connected with said pump and a manually operable release valve connecting said chamber and the interior of said piston, to control release flow between the exterior of said piston and the interior thereof independent of said pump.

3. In a lifting jack, a vertically disposed hollow cylinder, and a self-contained lifting unit vertically movable therein, said unit comprising a hollow plunger closed at its lower end and adapted to contain a lifting fluid, a pump mounted on and secured to said closed end, said pump having an intake within said plunger, an outlet discharging into said cylinder, and having a shaft extending vertically upward within and aligned by said plunger; a motor carried by the upper end of said plunger and having its shaft extending downwardly within and positioned by said plunger in alignment with said pump shaft, and coupling means for effecting driving engagement between said motor and said pump, said coupling means being engageable by placement of said motor and disengageable by removal of said motor.

4. In a lifting jack, a vertically disposed hollow cylinder, and a self-contained lifting unit vertically movable therein, said unit comprising a hollow plunger closed at its lower end and adapted to contain a lifting fluid, a pump mounted on and secured to said closed end, said pump having an intake within said plunger, an outlet discharging into said cylinder and means for preventing return flow through said pump, said pump having a shaft extending vertically upward within and aligned by said plunger; a motor carried by the upper end of said plunger and having its shaft extending downwardly within and positioned by said plunger in alignment with said pump shaft, and coupling means for effecting driving engagement between said motor and said pump, said coupling means being engageable by placement of said motor and disengageable by removal of said motor.

5. In a lifting jack, a vertically disposed hollow cylinder, and a self-contained lifting unit vertically movable therein, said unit comprising a hollow plunger closed at its lower end and adapted to contain a lifting fluid, a pump mounted on and secured to said closed end, said pump having an intake within said plunger, an outlet discharging into said cylinder and having a shaft extending vertically upward within and aligned by said plunger; a release valve mounted on said end closure, and manually operable means for opening said valve to permit flow from said cylinder into said plunger; a motor carried by the upper end of said plunger and having its shaft extending downwardly within and positioned by said plunger in alignment with said pump shaft, and coupling means for effecting driving engagement between said motor and said pump, said coupling means being engageable by placement of said motor and disengageable by removal of said motor.

6. In a lifting jack, a vertically disposed hollow cylinder, and a self-contained lifting unit vertically movable therein, said unit comprising a hollow plunger closed at its lower end and adapted to contain a lifting fluid, a pump mounted on and secured to said closed end, said pump having an intake within said plunger, an outlet discharging into said cylinder and means for preventing return flow through said pump, said pump having a shaft extending vertically upward within and aligned by said plunger; a release valve mounted on said end closure and manually operable means for opening said valve to permit flow from said cylinder into said plunger; a motor carried by the upper end of said plunger and having its shaft extending downwardly within and positioned by said plunger in alignment with said pump shaft, and coupling means for effecting driving engagement between said motor and said pump, said coupling means being engageable by placement of said motor and disengageable by removal of said motor.

7. In a lifting jack, a vertically disposed hollow cylinder, and a self-contained lifting unit vertically movable therein, said unit comprising a hollow plunger closed at the lower end and adapted to contain a lifting fluid, a pump mounted on and secured to said closed end, said pump having an intake within said plunger and discharging into said cylinder and having a shaft extending vertically upward within, and aligned by said plunger, a motor carried by the upper end of said plunger and having its shaft positioned by said plunger in alignment with said pump shaft, and disengageable means connecting said pump and motor shafts.

8. In a lifting jack, a vertically disposed hollow cylinder, and a self-contained lifting unit vertically movable therein, said unit comprising a hollow plunger closed at the lower end and adapted to contain a lifting fluid, a pump secured to and forming part of said closed end, said pump having an intake within said plunger and an outlet below said closed end and discharging into said cylinder, and having a shaft extending vertically upward within and aligned by said plunger, a motor carried by the upper end of said plunger and having its shaft positioned by said plunger in axial alignment with said pump shaft, a power connection between said pump and motor shafts, and a manually operable release valve mounted on said end closure and connecting said cylinder and the interior of said plunger, to control release flow between the interior of said plunger and the exterior thereof, independently of said pump.

9. In a lifting jack, a vertically disposed hollow cylinder, a self-contained lifting unit vertically movable therein, said unit comprising a hollow plunger closed at the lower end and adapted to contain a lifting fluid, a pump secured to and forming part of said closed end, said pump having an intake within said plunger and an outlet below said closed end discharging into said cylinder, and having a shaft extending vertically upward within and aligned by said plunger, a motor carried by the upper end of said plunger and having its shaft positioned by said plunger in axial alignment with said pump shaft, and disengageable means connecting said pump and motor shafts, whereby to permit removal and/or replacement of said motor independently of said pump.

10. In a lifting jack, a vertically disposed hollow cylinder, and a self-contained lifting unit vertically movable therein, said unit comprising a hollow plunger closed at the lower end and adapted to contain a lifting fluid, a pump secured to and forming part of said closed end, said pump having an intake within said plunger and an outlet below said closed end discharging into said cylinder, and having a shaft extending vertically upward within and aligned by said plunger, a motor carried by the upper end of said plunger and having its shaft positioned by said plunger in axial alignment with said pump shaft, disengageable means connecting said pump and motor shafts, a manually operable release valve connecting said cylinder and the interior of said plunger, to control release flow between the interior of said plunger and the exterior thereof, independently of said pump, and a check valve disposed in the discharge connection from said pump to said cylinder, to prevent return flow therethrough.

LOUIS C. STUKENBORG.